United States Patent [19]

Ducote

[11] Patent Number: 5,630,604
[45] Date of Patent: May 20, 1997

[54] REMOTELY-STEERED TRAILERS

[76] Inventor: Edgar A. Ducote, P.O. Box 45654, Baton Rouge, La. 70895

[21] Appl. No.: 509,455

[22] Filed: Jul. 31, 1995

Related U.S. Application Data

[63] Continuation-in-part of Ser. No. 371,383, Jan. 11, 1995, Pat. No. 5,501,288, which is a continuation-in-part of Ser. No. 130,470, Oct. 1, 1993, Pat. No. 5,392,872, which is a continuation-in-part of Ser. No. 807,199, Dec. 16, 1991, Pat. No. 5,305,844, which is a division of Ser. No. 594,716, Oct. 9, 1990, Pat. No. 5,135,064, which is a continuation-in-part of Ser. No. 337,292, Apr. 13, 1989, Pat. No. 5,026,085.

[51] Int. Cl.⁶ .................................................. B62D 53/06
[52] U.S. Cl. ........................................ 280/426; 280/443
[58] Field of Search ................................ 280/426, 423.1, 280/433, 442, 443, 444, 445

[56] References Cited

U.S. PATENT DOCUMENTS

| | | | |
|---|---|---|---|
| 1,619,941 | 3/1927 | Kennedy | 280/426 |
| 2,286,166 | 6/1942 | Carmody | 280/33.55 |
| 2,959,428 | 11/1960 | Felburn | 280/426 |
| 3,149,858 | 9/1964 | Le Roy Gilbert | 280/442 |
| 3,533,644 | 10/1970 | Humes | 280/426 |
| 3,712,641 | 1/1973 | Sherman | 280/426 |
| 3,734,538 | 5/1973 | Humes | 280/426 |
| 4,017,094 | 4/1977 | Pilcher | 280/404 |
| 4,120,509 | 10/1978 | Reeve et al. | 280/81 A |
| 4,244,596 | 1/1981 | Chung | 280/426 |
| 4,441,730 | 4/1984 | Damm | 280/426 |
| 4,463,966 | 8/1984 | Stoddard | 280/442 |
| 4,468,047 | 8/1984 | McGhie et al. | 280/419 |
| 4,484,758 | 11/1984 | Murray et al. | 280/442 |
| 4,570,965 | 2/1986 | Caswell | 280/426 |
| 4,740,006 | 4/1988 | Ducote | 280/426 |
| 5,282,641 | 2/1994 | McLaughlin | 280/442 X |
| 5,329,451 | 7/1994 | Notsu | 280/442 X |
| 5,558,350 | 9/1996 | Kimbrough et al. | 280/426 |

FOREIGN PATENT DOCUMENTS

| | | | |
|---|---|---|---|
| 1957662 | 5/1971 | Germany | 280/316 |
| 2312565 | 9/1974 | Germany | 280/316 |
| 94330 | 5/1960 | Netherlands | 280/426 |
| 556066 | 6/1977 | U.S.S.R. | 280/442 |

OTHER PUBLICATIONS

*Encyclopedia Britannica*, pp. 721–723, vol. 18, Chicago: Encyclopedia Britannica, Inc., 15th Edition.

*Primary Examiner*—Kevin Hurley
*Attorney, Agent, or Firm*—Reginald. F. Roberts, Jr.

[57] ABSTRACT

A remotely-steered trailer, and a sensor for sensing the direction of motion of a vehicle towing the trailer. The sensor includes a source of varying electrical potential, rigidly fastened to the trailer; a pointer in electrical contact with the source of varying electrical potential; and a bar resiliently and perpendicularly connected to the pointer, pivotally connected to the trailer, and held in contact with the towing vehicle by a spring disposed between the pointer and the bar.

17 Claims, 5 Drawing Sheets

REMOTELY-STEERED TRAILERS

CROSS-REFERENCES TO RELATED APPLICATIONS

This application is a continuation-in-part of application Ser. No. 08/371,383, filed Jan. 11,1995, U.S. Pat. No. 5,501,288, which is a continuation-in-part of application Ser. No. 08/130,470, filed Oct. 1, 1993, U.S. Pat. No. 5,392,872, which is a continuation-in-part of application Ser. No. 07/807,199, filed Dec. 16, 1991, U.S. Pat. No. 5,305,844, which is a division of application Ser. No. 07/594,716, filed Oct. 9, 1990, U.S. Pat. No. 5,135,064, which is a continuation-in-part of application Ser. No. 07/337,292, filed Apr. 13, 1989, U.S. Pat. No. 5,026,085.

BACKGROUND OF THE INVENTION

The present invention relates to steering. More particularly, the invention relates to steering towed vehicles by remote control.

Towed vehicles may be highway trailers, horse trailers, RV mobile homes, boat trailers, or equipment trailers. At the present time most of such vehicles are equipped with conventional tandem axles.

Highway trailers have the tandem axles located near the rear end of the trailer. Horse trailers, RV mobile homes, boat trailers, and equipment trailers have the tandem axles located at approximately the longitudinal center of the trailer. Tandem axles essentially function as a single point of support for the trailer. In every case the tires of the tandem axles scrub and drag when the trailer varies from a straight path, and there is undesirable vertical motion at all times. Horse trailers, RV mobile homes, boat trailers, equipment trailers, and in general all trailers with tandem axles near the longitudinal center thereof sustain near-continuous bobbing at the front and rear ends of the trailers. The front end of the trailer is articulated to a towing vehicle which rocks up and down in response to the bobbing of the towed vehicle at the hitch—a major complaint by towing-vehicle operators.

The present invention addresses and solves these problems.

SUMMARY OF THE INVENTION

In general, the present invention in a first aspect provides a remotely-steered trailer. The remotely-steered trailer has front and rear ends, and is towed by towing means having front and rear ends. The remotely-steered trailer comprises a trailer supported by a pair of steerable wheels pivotally connected to a first fixed axle, and by a pair of fixed wheels mounted on a second fixed axle; means for coupling the trailer to the towing means; and means for sensing the direction of the towing means. In a first embodiment, the first fixed axle bearing the steerable wheels is disposed near the rear end of the trailer, and the second fixed axle bearing the fixed wheels is disposed near the longitudinal center of the trailer. In a second embodiment, the first fixed axle bearing the steerable wheels is disposed near the longitudinal center of the trailer, and the second fixed axle bearing the fixed wheels is disposed near the rear end of the trailer.

The sensing means include an electrical sensor in contact with the towing means. The sensor is constructed and arranged to produce an electrical signal indicative of the direction of motion of the towing means.

The remotely-steered trailer further comprises a servomechanism constructed and arranged to receive the electrical signal from the electrical sensor, and to forcibly steer the steerable wheels of the trailer in accordance with said signal.

In a second aspect the invention provides an electrical sensor for sensing the direction of motion of a first vehicle towing a second vehicle. The sensor comprises a source of varying electrical potential, rigidly fastened to the second vehicle; a pointer in electrical contact with the source of varying electrical potential; and a rigid elongated member resiliently and perpendicularly connected to the pointer, pivotally connected to the second vehicle, and held in contact with the first vehicle by biasing means disposed between the pointer and the elongated member.

DETAILED DESCRIPTION OF THE INVENTION

Figure 1:
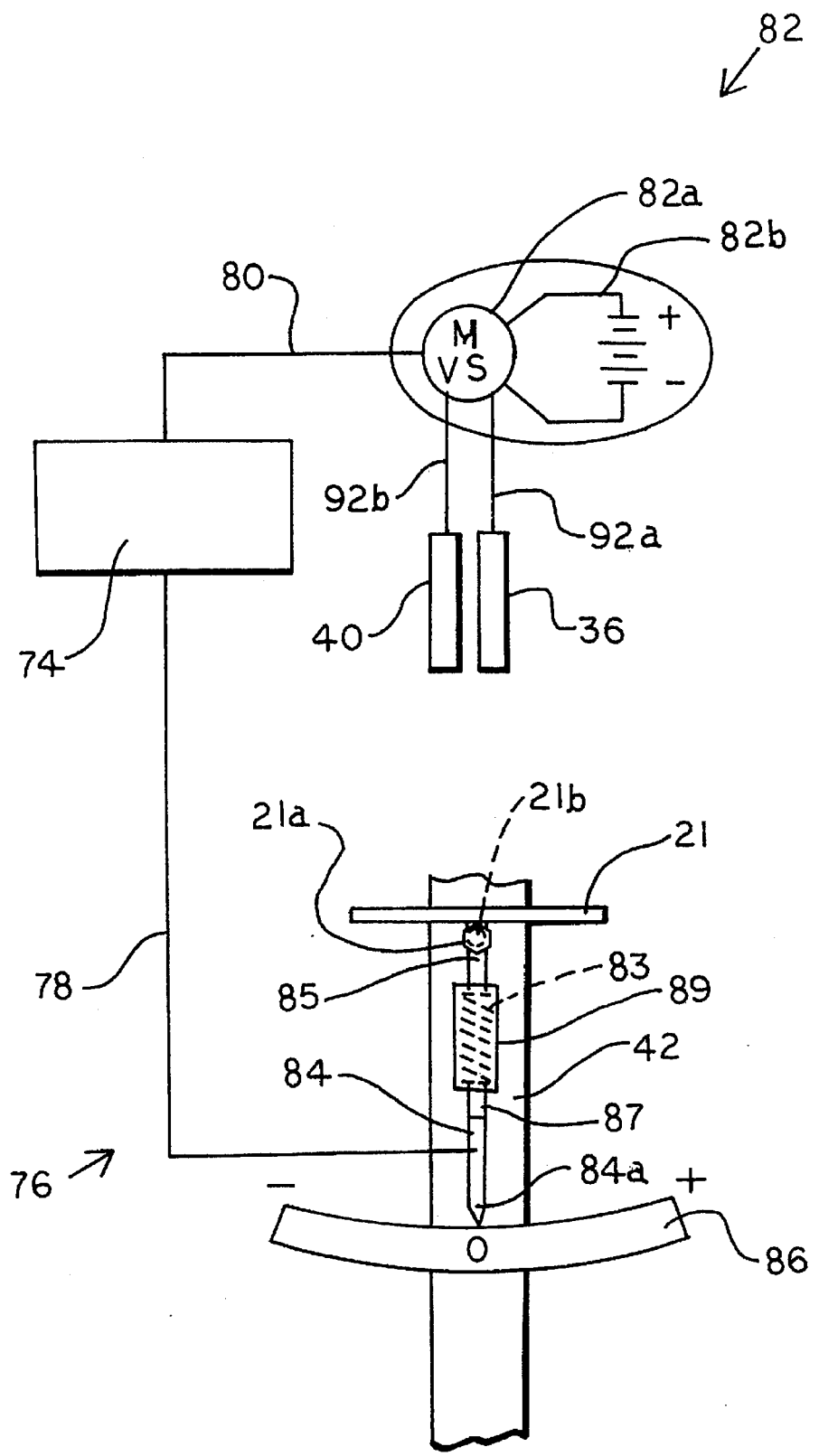
FIG. 1 is a schematic representation of an electrical sensor and a servomechanism, made in accordance with the principles of the present invention.

More specifically, reference is made to FIG. 1, in which is shown an electrical sensor made in accordance with the principles of the present invention, and Generally designated by the numeral 76.

The electrical sensor 76 comprises a pointer 84 in electrical contact with a source 86 of varying electrical potential, and a microprocessor 74. A rod 21 is resiliently and perpendicularly connected to the pointer 84 by biasing means such as a compression spring 83 and contact bars 85 and 87. The spring 83 is beneficially disposed in a housing 89.

The pointer 84 tapers to a point 84a at the point of contact with the source 86 of varying electrical potential, in order the better and more precisely to sense the electrical potential at the point of contact.

The electrical potential of the source 86 preferably varies from a maximum positive value at one end of the source 86 range to a maximum negative value at the other and opposite end of the range, with the middle of the range having zero electrical potential. Even more preferably, the source 86 of varying electrical potential is concave.

As shown in FIGS. 2A, 2B, 3, 4A, 4B, 5, 6A, 6B, and 7, the rod 21 is in contact with a vehicle used to tow a trailer, and is pivotally connected by a bolt 21A disposed in a sleeve 21B to a bracket 42 which is fastened to the trailer. The sleeve 21b is fastened to the rod 21, preferably by welding. The source 86 of varying electrical potential is fastened by the bracket 42 to the trailer. The potential contacted by the pointer 84 therefore depends upon the orientation of the towing means and the trailer with respect to one another.

The potential sensed by the pointer 84 is transmitted via a first wire 78 to the microprocessor 74, which is programmable and programmed to receive a first signal indicative of the potential contacted by the pointer 84, and to transmit a second signal by a second wire 80 to a servomechanism 82 which controls steerable wheels at the rear of the trailers shown in FIGS. 2A, 2B, 4A, 4B, 6A, and 6B. The servomechanism 82 controls a steering shaft 36 for the steerable wheels via a connecting member 92a, or a steering arm 40 for the steerable wheels via a connecting member 92b.

Although the servomechanism 82 may utilize hydraulic or pneumatic pressure, the servomechanism 82 preferably includes an electric motor 82a. Even more preferably, the motor 82a is a variable-speed, reversible motor. Power for operating the motor 82a may be provided, for example, by an electric battery 82b. Alternatively, the electric power may be provided, for example, by an electric generator (not shown) which is part of the equipment of the towing vehicle.

The motor 82a is responsive to the signal received from the microprocessor 74. More specifically, the signal transmitted by the microprocessor 74 to the servomechanism 82 controls the speed and direction of rotation of the rotor (not shown) in the motor 82a. The motor 82a controls the steering shaft 36 or the steering arm 40, which causes the steerable wheels to turn in accordance with the orientation and position of the towing means sensed by the sensor 76 and with the particular geometry of the trailer.

A detailed description of the manner in which the servomechanism 82 controls the steerable wheels is provided by U.S. Pat. No. 5,139,103 to Ducote, herein incorporated by reference, at column 15, lines 14–27, and FIGS. 5–7, by U.S. Pat. No. 5,123,669 to Ducote, herein incorporated by reference, at column 19, lines 31–63, and FIG. 4, and by U.S. Pat. No. 4,740,006 to Ducote, herein incorporated by reference, at column 6, lines 60 to column 7, line 3, and FIGS. 2 and 3.

FIGS. 2A, 2B, 3, 4A, 4B, 5, 6A, 6B, and 7 relate to technology for articulating towing means to towed vehicles steered by remote control, using the sensor 76 and servomechanism 82 shown in FIG. 1.

Figure 2A:
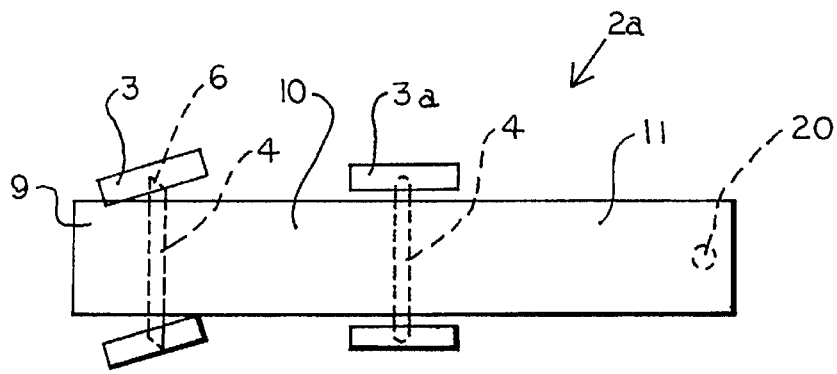
FIG. 2A is a top plan view of a first embodiment of a trailer made in accordance with the principles of the present invention.
Figure 3:
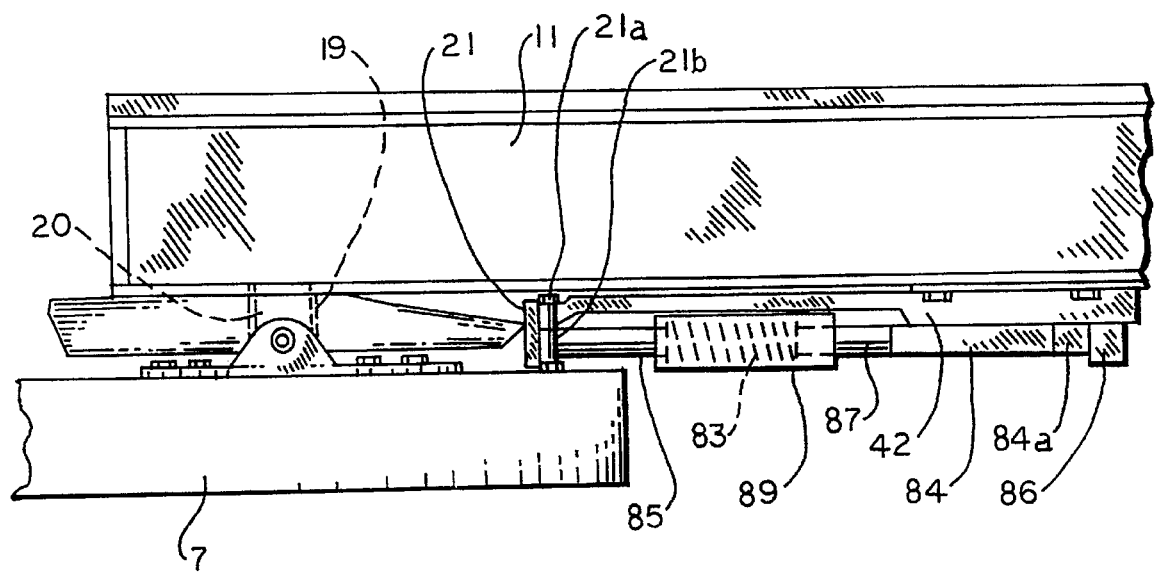
FIG. 3 is a side-elevational view of the electrical sensor shown in FIG. 1, part of the trailer shown in FIG. 2A or 2B, and part of means for towing the trailer shown in FIG. 2A or 2B, connected to one another in accordance with the principles of the present invention.
Figure 2B:
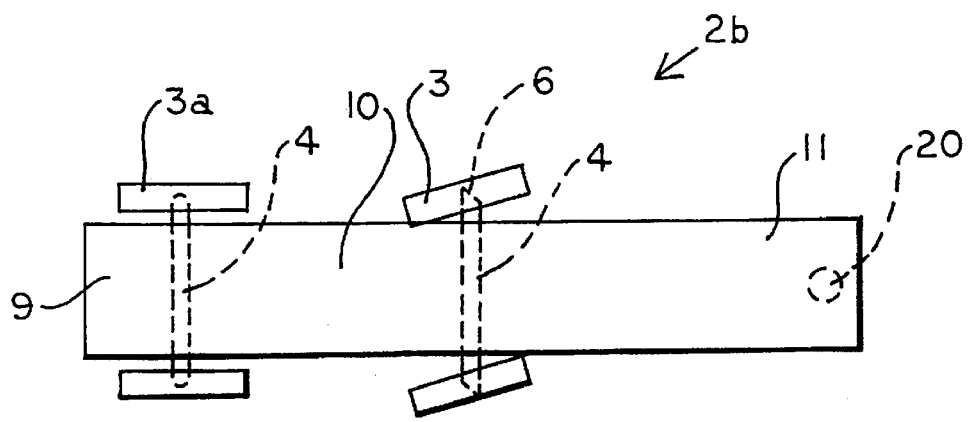
FIG. 2B is a top plan view of a second embodiment of a trailer made in accordance with the principles of the present invention.

Reference is now made to FIGS. 2A, 2B, and 3, in which are shown first and second embodiments 2a and 2b of a trailer made in accordance with the principles of the present invention, the front end 11 of the trailer 2a or 2b being connected to the rear end 7 of a vehicle (not shown) for towing the trailer 2a or 2b.

FIG. 2A shows a first embodiment 2a of a trailer having a first fixed axle 4 equipped with steerable wheels 3 disposed near the rear end 9 of the trailer 2a. The steerable wheels 3 are pivotally connected by spindles 6 to the first axle 4. A second fixed axle 4 equipped with fixed wheels 3a is disposed near the longitudinal center 10 of the trailer 2a.

FIG. 2B shows a second embodiment 2b of a trailer having a first fixed axle 4 equipped with steerable wheels 3 and spindles 6 disposed near the longitudinal center 10 of the trailer 2b, and a second fixed axle 4 equipped with fixed wheels 3a near the rear end 9 of the trailer 2b.

The trailer 2a or 2b is articulated to the rear end 7 of a towing vehicle (not shown) by a king pin 20 fastened to the underside of the front end 11 of the trailer 2a or 2b, and disposed in a central first opening 19 in a fifth wheel 8 fastened to the rear end 7 of the towing vehicle.

The rod 21 is held in resilient contact with the fifth wheel 8 by the spring 83. The rod 21 is pivotally connected to the underside of the front end 11 of the trailer 2a or 2b by the bolt 21a disposed in the sleeve 21b at the longitudinal center of the rod 21. The bracket 42 is rigidly fastened to the underside of the front end 11 of the trailer 2a or 2b.

As the position of the rod 21 and therefore of the pointer 84 changes in response to changes of position of the fifth wheel 8 caused by changes in direction of motion of the towing vehicle, the electrical potential contacted by the pointer 84 changes in a manner indicative of the position of the pointer 84, the rod 21, the fifth wheel 8, and the towing vehicle (not shown). When the towing vehicle is travelling in a straight line, the pointer 84 is at the center of the scale of the source 86 of varying electrical potential, and the potential reading is zero. As the towing vehicle begins a right turn, the voltage becomes positive, and the magnitude of the voltage is proportional to the degree of the turn. When the turn has been completed, the voltage falls to zero. In a similar manner, when the towing vehicle makes a left turn, the voltage takes on a negative value. By this mechanism an electrical signal is generated by the sensor 76, which signal is indicative of the direction of motion of the towing vehicle. If desired, the electrical polarities may of course be reversed, the zero point displaced toward positive or negative polarity, or the apparatus and method otherwise modified while remaining within the scope of the present invention.

The concave shape of the source 86 of varying potential is required in order to keep the pointer 84 in constant contact with the source 86 while the turns are made. The degree of curvature of the source 86 is fixed by the arc defined by the movement of the pointer end 84a as the turns are made.

Figure 4A:
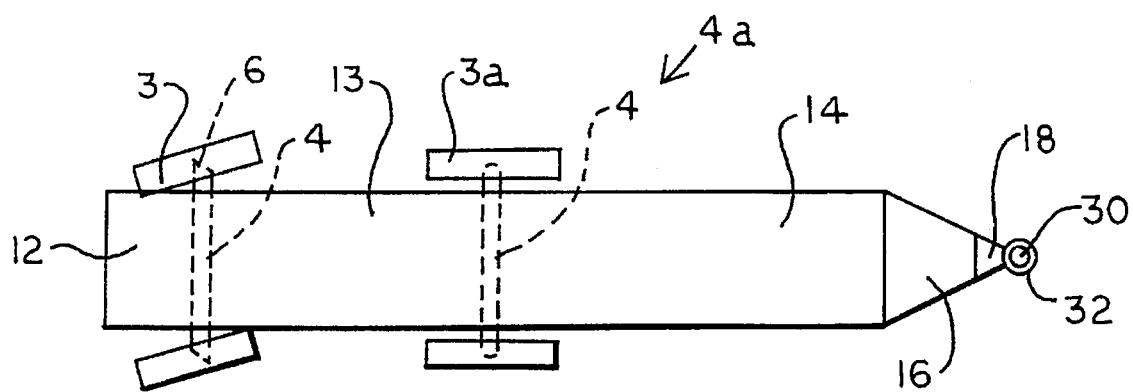
FIG. 4A is a top plan view of a third embodiment of a trailer made in accordance with the principles of the present invention.
Figure 5:
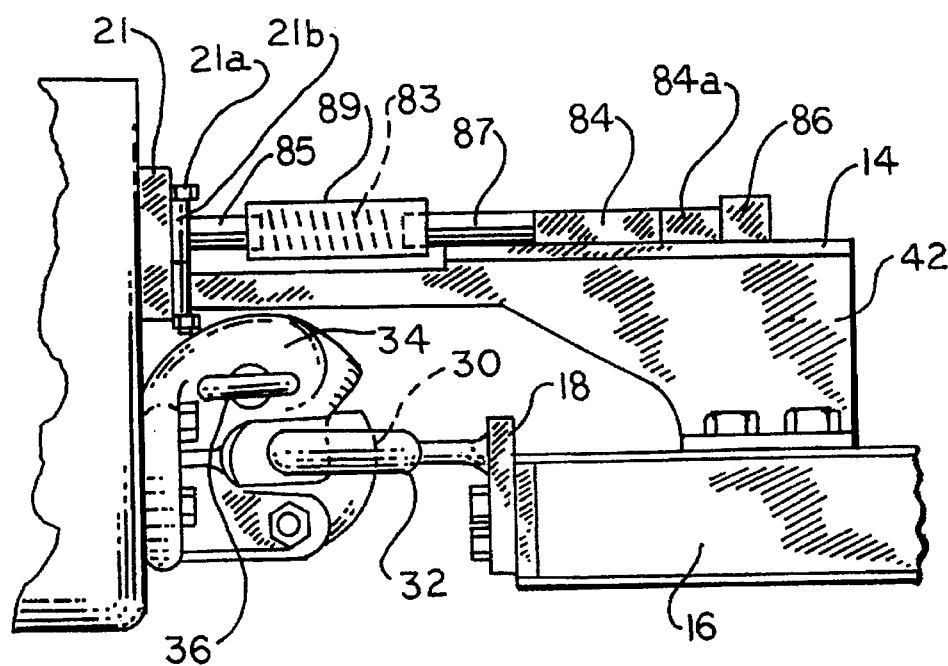
FIG. 5 is a side-elevational view of the electrical sensor shown in FIG. 1, part of the trailer shown in FIG. 4A or 4B, and part of means for towing the trailer shown in FIG. 4A or 4B, connected to one another in accordance with the principles of the present invention.
Figure 4B:
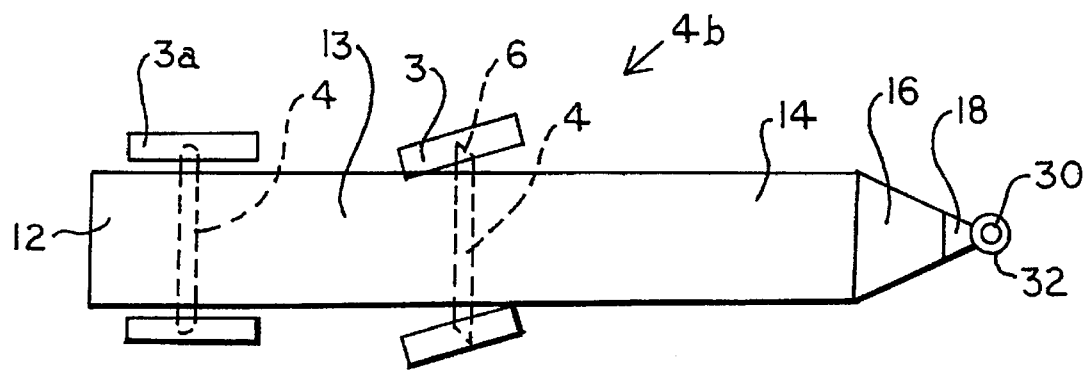
FIG. 4B is a top plan view of a fourth embodiment of a trailer made in accordance with the principles of the present invention.

Reference is now made to FIGS. 4A, 4B, and 5, in which are shown third and fourth embodiments 4a and 4b of a trailer made in accordance with the principles of the present invention, the front end 14 of the trailer 4a or 4b being connected to the rear end 7 of a vehicle (not shown) for towing the trailer 4a or 4b.

FIG. 4A shows a third embodiment 4a of a trailer having a first fixed axle 4 equipped with steerable wheels 3 disposed near the rear end 12 of the trailer 4a. The steerable wheels 3 are pivotally connected by spindles 6 to the first axle 4. A second fixed axle 4 equipped with fixed wheels 3a is disposed near the longitudinal center 13 of the trailer 4a.

FIG. 4B shows a fourth embodiment 4b of a trailer having a first fixed axle 4 equipped with steerable wheels 3 and spindles 6 disposed near the longitudinal center 13 of the trailer 4b, and a second fixed axle 4 equipped with fixed wheels 3a near the rear end 12 of the trailer 4b.

The trailer 4a or 4b is articulated to the rear end 7 of the towing vehicle (not shown) by a tongue 16, a brace 18, an eye 32 having an opening 30, a pintle 34, and a pintel hook 36. The pintle 34 is fastened to the rear end 7 of the towing vehicle. The source 86 of varying electrical potential is fastened to the tongue 16 of the trailer 4a or 4b by the bracket 42. The rod 21 is held in resilient contact with the rear end 7 of the towing vehicle by the spring 83. The remaining elements 21a, 21b, 84, 84a, and 86 shown in FIG. 5 function in the same manner as has been described hereinabove with reference to FIG. 3.

Figure 6B:
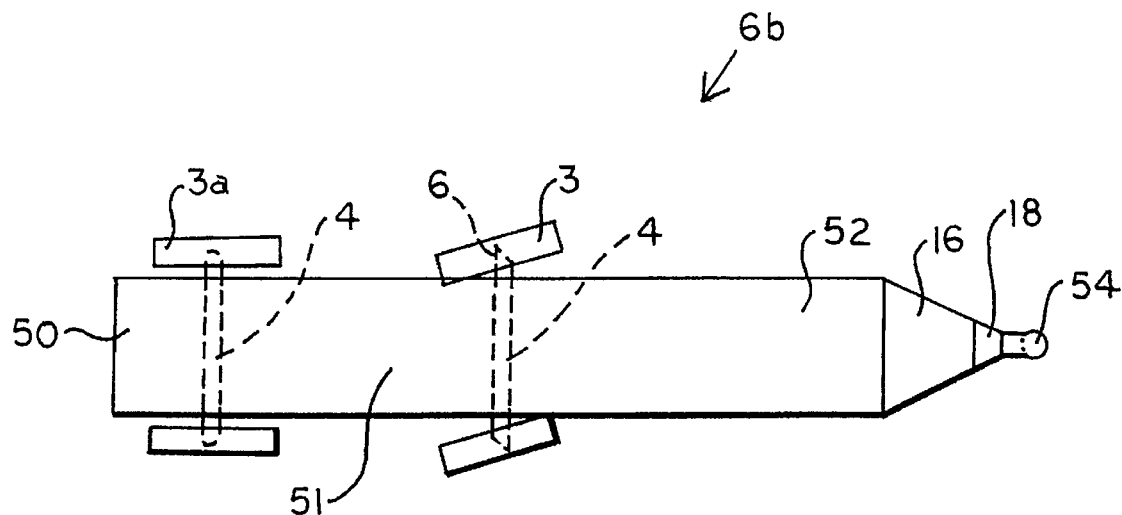
FIG. 6B is a top plan view of a sixth embodiment of a trailer made in accordance with the principles of the present invention.
Figure 6A:
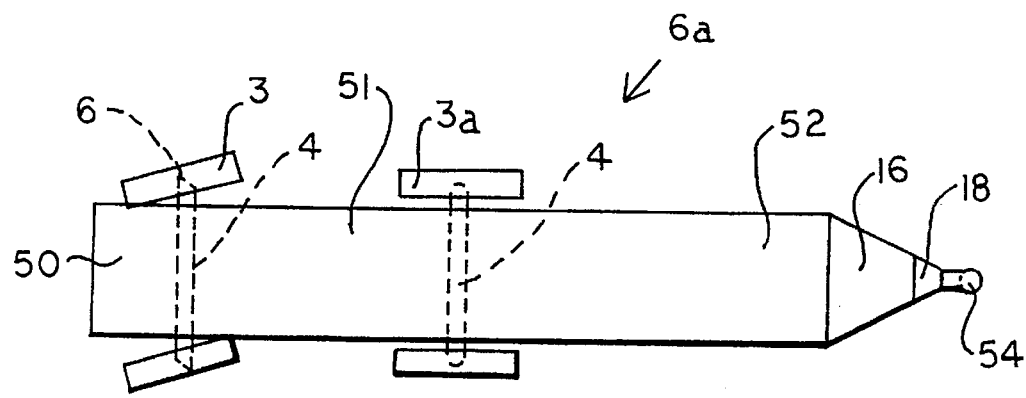
FIG. 6A is a top plan view of a fifth embodiment of a trailer made in accordance with the principles of the present invention.
Figure 7:
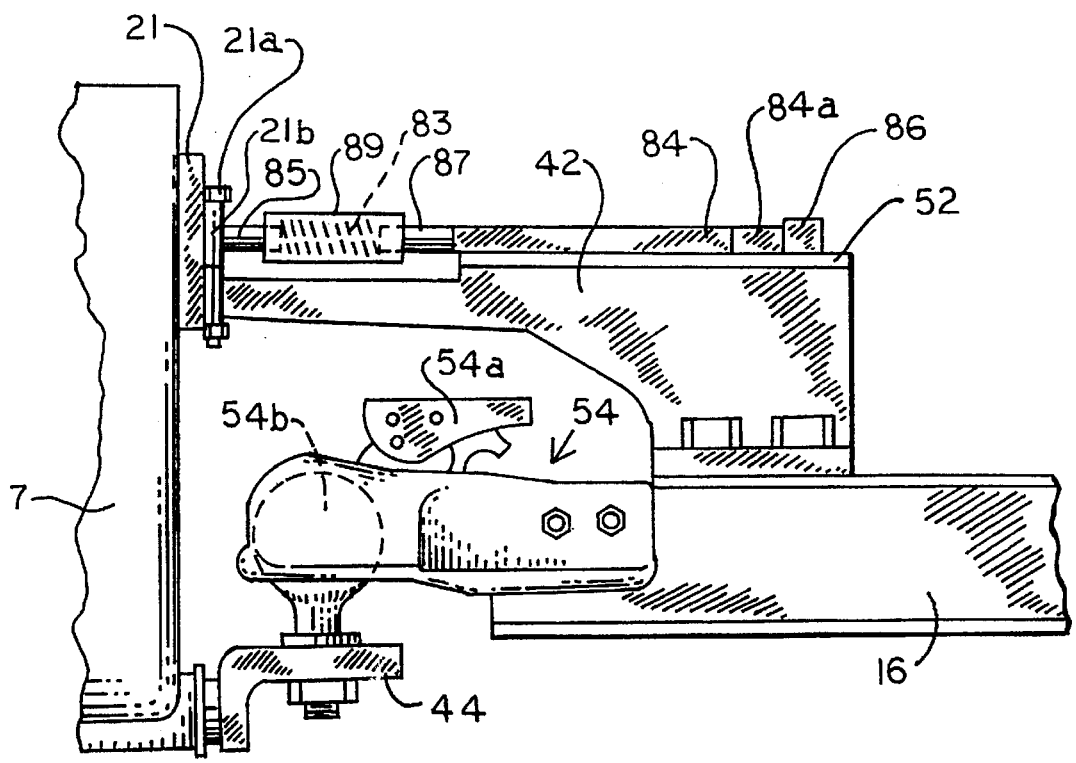
FIG 7 is a side-elevational view of the sensor shown in FIG. 1, part of the trailer shown in FIG. 6A or 6B, and part of means for towing the trailer shown in FIG. 6A or 6B, connected to one another in accordance with the principles of the present invention.

Reference is now made to FIGS. 6A, 6B, and 7, in which are shown fifth and sixth embodiments 6a and 6b of a trailer made in accordance with the principles of the present invention, the front end 52 of the trailer 6a or 6b being connected to the rear end 7 of a vehicle (not shown) for towing the trailer 6a or 6b.

FIG. 6A shows a fifth embodiment 6a of a trailer having a first fixed axle 4 equipped with steerable wheels 3 disposed near the rear end 50 of the trailer 6a. The steerable wheels 3 are pivotally connected by spindles 6 to the first axle 4. A second fixed axle 4 equipped with fixed wheels 3a is disposed near the longitudinal center 51 of the trailer 6a.

FIG. 6B shows a sixth embodiment 6b of a trailer having a first fixed axle 4 equipped with steerable wheels 3 and spindles 6 disposed near the longitudinal center 51 of the trailer 6b, and a second fixed axle 4 equipped with fixed wheels 3 near the rear end 50 of the trailer 6b.

The trailer 6a or 6b is articulated to the rear end 7 of the towing vehicle (not shown) by a tongue 16, a brace 18, and a ball hitch 54. The ball hitch 54 includes a latch 54a and a ball 54b. The ball 54b is fastened to the rear end 7 of the towing vehicle. The source 86 of varying electrical potential is fastened to the tongue 16 of the trailer 6a or 6b by the bracket 42. The rod 21 is held in resilient contact with the rear end 7 of the towing vehicle by the spring 83. The remaining elements 21a, 21b, 84, 84a, and 86 shown in FIG. 7 function in the same manner as has been described hereinabove with reference to FIG. 3.

I claim:

1. A remotely-steered trailer having front and rear ends, and towed by towing means having front and rear ends, the remotely-steered trailer comprising:
   (a) a trailer supported by a pair of steerable wheels pivotally connected to a first fixed axle near the rear end of the trailer, and by a pair of fixed wheels mounted on a second fixed axle near the longitudinal center of the trailer;
   (b) means for coupling the trailer to the towing means;
   (c) means for sensing the direction of motion of the towing means, said sensing means including an electrical sensor contiguous with the towing means, the sensor being constructed and arranged to produce an electrical signal indicative of the direction of motion of the towing means; and
   (d) a servomechanism constructed and arranged to receive the electrical signal from the electrical sensor, and to forcibly steer the steerable wheels near the rear end of the trailer in accordance with said signal.

2. The remotely-steered trailer of claim 1, wherein the electrical sensor includes
   (e) a source of varying electrical potential; and
   (f) a pointer responsive to the direction of motion of the towing means.

3. The remotely-steered trailer of claim 2, wherein the electrical potential of the source varies from a maximum positive value through zero potential to a maximum negative value.

4. The remotely-steered trailer of claim 2, wherein one end of the pointer contacts the source of varying electrical potential, and the pointer tapers to a point at the end of the pointer which contacts the source of varying electrical potential.

5. The remotely-steered trailer of claim 2, wherein the source of varying electrical potential is concave.

6. The remotely-steered trailer of claim 2, wherein:
   (g) the source of varying electrical potential is fastened to the trailer;
   (h) the towing means include a fifth wheel near the rear end of the towing means;
   (i) the means for coupling the trailer to the towing means include a king pin fastened to the underside of the front end of the trailer and disposed in a central opening in the fifth wheel of the towing means; and
   (j) the means for sensing the direction of motion of the towing means include
   (k) rod resiliently and perpendicularly connected to the pointer, pivotally connected to the trailer, and held in contact with the fifth wheel by biasing means disposed between the pointer and the rod.

7. The remotely-steered trailer of claim 2, wherein:
   (g) the source of varying electrical potential is fastened to the trailer;
   (h) the means for coupling the trailer to the towing means include a tongue, a brace, and a pintle hook; and
   (i) the means for sensing the direction of motion of the towing means include a rod resiliently and perpendicularly connected to the pointer, pivotally connected to the trailer, and held in contact with the rear end of the towing means by biasing means disposed between the pointer and the rod.

8. The remotely-steered trailer of claim 2, wherein:
   (g) the source of varying electrical potential is fastened to the trailer;
   (h) the means for coupling the trailer to the towing means include a tongue, a brace, and a ball hitch; and
   (i) the means for sensing the direction of motion of the towing means include a rod resiliently and perpendicularly connected to the pointer, pivotally connected to the trailer, and held in contact with the rear end of the towing means by biasing means disposed between the pointer and the rod.

9. A remotely-steered assembly of a first vehicle towing a second vehicle, the assembly comprising:
   (a) a source of varying electrical potential, rigidly fastened to the second vehicle;
   (b) a pointer in electrical contact with the source of varying electrical potential; and
   (c) a rod resiliently and perpendicularly connected to the second vehicle, and held in contact with the first vehicle by biasing means disposed between the pointer and the rod.

10. A remotely-steered trailer having front and rear ends, and towed by towing means having front and rear ends, the remotely-steered trailer comprising:
   (a) a trailer supported by a pair of steerable wheels pivotally connected to a first fixed axle near the longitudinal center of the trailer, and by a pair of fixed wheels mounted on a second fixed axle near the rear end of the trailer;
   (b) means for coupling the trailer to the towing means;
   (c) means for sensing the direction of motion of the towing means, said sensing means including an electrical sensor contiguous with the towing means, the sensor being constructed and arranged to produce an electrical signal indicative of the direction of motion of the towing means; and (d) a servomechanism constructed and arranged to receive the electrical signal from the electrical sensor, and to forcibly steer the steerable wheels near the longitudinal center of the trailer in accordance with said signal.

11. The remotely-steered trailer of claim 10, wherein the electrical sensor includes (e) a source of varying electrical potential; and (f) a pointer responsive to the direction of motion of the towing means.

12. The remotely-steered trailer of claim 11, wherein the electrical potential of the source varies from a maximum positive value through zero potential to a maximum negative value.

13. The remotely-steered trailer of claim 11, wherein one end of the pointer contacts the source of varying electrical potential, and the pointer tapers to a point at the end of the pointer which contacts the source of varying electrical potential.

14. The remotely-steered trailer of claim 11, wherein the source of varying electrical potential is concave.

15. The remotely-steered trailer of claim 11, wherein:

(g) the source of varying electrical potential is fastened to the trailer;

(h) the towing means include a fifth wheel near the rear end of the towing means;

(i) the means for coupling the trailer to the towing means include a king pin fastened to the underside of the front end of the trailer and disposed in a central opening in the fifth wheel of the towing means; and (j) the means for sensing the direction of motion of the towing means include (k) rod resiliently and perpendicularly connected to the pointer, pivotally connected to the trailer, and held in contact with the fifth wheel by biasing means disposed between the pointer and the rod.

16. The remotely-steered trailer of claim 11, wherein:

(g) the source of varying electrical potential is fastened to the trailer;

(h) the means for coupling the trailer to the towing means include a tongue, a brace, and a pintle hook; and (i) the means for sensing the direction of motion of the towing means include a rod resiliently and perpendicularly connected to the pointer, pivotally connected to the trailer, and held in contact with the rear end of the towing means by biasing means disposed between the pointer and the rod.

17. The remotely-steered trailer of claim 11, wherein:

(g) the source of varying electrical potential is rigidly fastened to the trailer;

(h) the means for coupling the trailer to the towing means include a tongue, a brace, and a ball hitch; and (i) the means for sensing the direction of motion of the towing means include a rod resiliently and perpendicularly connected to the pointer, pivotally connected to the trailer, and held in contact with the rear end of the towing means by biasing means disposed between the pointer and the rod.

* * * * *